(12) United States Patent
Pencak (10) Patent No.: US 11,952,053 B2
(45) Date of Patent: Apr. 9, 2024

(54) BRACKET FOR TAILGATE ACTUATION SYSTEM IN VEHICLES

(71) Applicant: Nissan North America, Inc., Franklin, TN (US)

(72) Inventor: Jeffrey G. Pencak, Cass City, MI (US)

(73) Assignee: Nissan North America, Inc., Franklin, TN (US)

( * ) Notice: Subject to any disclaimer, the term of this patent is extended or adjusted under 35 U.S.C. 154(b) by 230 days.

(21) Appl. No.: 17/333,312

(22) Filed: May 28, 2021

(65) Prior Publication Data
US 2022/0379978 A1    Dec. 1, 2022

(51) Int. Cl.
B62D 33/03 (2006.01)
B62D 33/027 (2006.01)
E05F 1/12 (2006.01)

(52) U.S. Cl.
CPC ........ B62D 33/0273 (2013.01); E05F 1/1238 (2013.01); *B62D 33/03* (2013.01); *E05Y 2900/546* (2013.01)

(58) Field of Classification Search
CPC .. B62D 33/0273; B62D 33/027; B62D 33/03; B60J 5/107; B60J 5/108; E05F 1/1238; E05Y 2900/546
USPC ....................................................... 296/57.1
See application file for complete search history.

(56) References Cited

U.S. PATENT DOCUMENTS

| | | | | |
|---|---|---|---|---|
| 9,126,630 B1 * | 9/2015 | Gallagher | ............ | B62D 27/023 |
| 11,479,307 B2 * | 10/2022 | Sridhar | ................ | B62D 33/077 |
| 2005/0285425 A1 * | 12/2005 | Romig | ...................... | B60P 1/26 296/50 |
| 2006/0202500 A1 * | 9/2006 | Eschebach | ......... | B62D 33/0273 296/57.1 |
| 2006/0220409 A1 * | 10/2006 | Smith | ................ | B62D 33/0273 296/57.1 |
| 2008/0054667 A1 * | 3/2008 | Ohly | .................. | B62D 33/0273 296/57.1 |
| 2008/0100085 A1 * | 5/2008 | Ohly | .................. | B62D 33/0273 296/57.1 |
| 2010/0084885 A1 * | 4/2010 | Townson | .............. | E05D 11/084 49/386 |
| 2017/0370132 A1 * | 12/2017 | Da Deppo | .............. | E05B 81/16 |
| 2019/0211598 A1 * | 7/2019 | Hemphill | ............... | B62D 33/03 |
| 2020/0190887 A1 * | 6/2020 | Gerken | ............. | B62D 33/0273 |
| 2020/0284077 A1 * | 9/2020 | Börjesson | ............ | B62D 65/024 |
| 2021/0284251 A1 * | 9/2021 | Dearing | .................. | E05D 5/062 |

(Continued)

FOREIGN PATENT DOCUMENTS

EP    1373671 B1    8/2004
KR    10-1250694    *    4/2013    ................ B60J 5/10

*Primary Examiner* — Gregory A Blankenship
(74) *Attorney, Agent, or Firm* — Young Basile Hanlon & MacFarlane, P.C.

(57) ABSTRACT

A vehicle is disclosed that includes: a vehicle body having an outer body panel; a tailgate that is movable in relation to the vehicle body via a tailgate actuation system between a closed position and an open position; and a bracket that is configured to receive the tailgate actuation system. The bracket includes a main body portion and an appendage that extends transversely from the main body portion such that the appendage engages the vehicle body to inhibit rotational deflection of the tailgate actuation system and, thus, lateral flexure of the outer body panel during movement of the tailgate.

20 Claims, 9 Drawing Sheets

(56) References Cited

U.S. PATENT DOCUMENTS

2021/0371017 A1* 12/2021 Heins ................. B62D 33/0273
2022/0089227 A1*  3/2022 Sridhar ............... B62D 33/077
2022/0316564 A1* 10/2022 Ozog .................... F16H 25/20
2022/0379978 A1* 12/2022 Pencak ................ E05F 1/1238

* cited by examiner

BRACKET FOR TAILGATE ACTUATION SYSTEM IN VEHICLES

TECHNICAL FIELD

The present disclosure relates to tailgates for vehicles and, more specifically, to a bracket for use with a tailgate actuation system.

BACKGROUND

Many vehicles include cargo areas at the rear end of the vehicle that are enclosed by a movable tailgate. In more modern vehicles, opening and closure (e.g., lowering and raising) of the tailgate is often supported, regulated, or otherwise facilitated by a tailgate actuation system that includes one or more pneumatic components, hydraulic components, etc. As a result of the high force concentrations distributed through the rear end of the vehicle by the tailgate actuation system, during tailgate operation, visible movement is often observed in one or more outer body panels of the vehicle that creates an undesirable "breathing effect."

To address this concern, a variety of reinforcements (e.g., brackets, supports, and the like) have been developed for tailgate actuation systems with little regard to cost, mass, and performance. As such, a need remains for a reinforcement solution that not only reduces (if not entirely eliminates) visible movement in the vehicle's outer body panels during tailgate operation, but the overall complexity, cost, and mass of the vehicle.

SUMMARY

In one aspect of the present disclosure, a vehicle is disclosed that includes: a vehicle body having an outer body panel; a tailgate that is movable in relation to the vehicle body via a tailgate actuation system between a closed position and an open position; and a bracket that is configured to receive the tailgate actuation system. The bracket includes a main body portion and an appendage that extends transversely from the main body portion such that the appendage engages the vehicle body to inhibit rotational deflection of the tailgate actuation system and, thus, lateral flexure of the outer body panel during movement of the tailgate.

In certain embodiments, the bracket may be monolithically formed from a single piece of material.

In certain embodiments, the bracket may include a cross-sectional thickness that lies (substantially) within the range of (approximately) 4 mm to (approximately) 8 mm.

In certain embodiments, the appendage may extend from the main body portion in (generally) orthogonal relation.

In certain embodiments, the bracket may be directly connected to the vehicle body.

In certain embodiments, the bracket may be connected to the vehicle body via one or more mechanical fasteners.

In certain embodiments, the bracket may be welded to the vehicle body.

In certain embodiments, the bracket may be indirectly connected to the vehicle body.

In certain embodiments, the vehicle may further include an adhesive that is located between the appendage and the vehicle body to accommodate for manufacturing variations and reduce gapping between the bracket and the vehicle body.

In certain embodiments, the adhesive may be thermally curable to allow for repositioning of the bracket during connection to the vehicle body to increase precision in orientation of the bracket.

In another aspect of the present disclosure, a vehicle is disclosed that includes: a vehicle body; a tailgate that is movably supported in relation to the vehicle body; a tailgate actuation system that is connected to the tailgate; and a bracket.

The vehicle body includes: an outer body panel; a strut tower that is located inwardly of the outer body panel; a first bolster that extends transversely in relation to the strut tower; and a second bolster that is positioned within the first bolster such that the first bolster is located between the strut tower and the second bolster. The strut tower defines an inner lateral surface and a rear surface that extends transversely in relation to the inner lateral surface.

The tailgate actuation system includes an actuator and a hinge assembly that extends between the actuator and the tailgate to convert linear movement of the actuator into rotational movement of the tailgate to open and close the tailgate.

The bracket includes a main body portion and an appendage that extends from the main body portion. The main body portion is connected to the inner lateral surface of the strut tower and the appendage is connected to the rear surface of the strut tower.

The hinge assembly extends through the bracket to thereby reduce torsional displacement of the hinge assembly and lateral flexure of the outer body panel during operation of the tailgate actuation system.

In certain embodiments, the appendage may extend from the main body portion in (generally) orthogonal relation.

In certain embodiments, the appendage may be indirectly connected to the rear surface of the strut tower.

In certain embodiments, the vehicle may further include an adhesive that is located between the appendage and the rear surface of the strut tower to increase surface area contact therebetween.

In certain embodiments, the adhesive may be thermally curable to allow for repositioning of the bracket during connection of the appendage to the rear surface of the strut tower to increase precision in orientation of the bracket.

In another aspect of the present disclosure, a bracket is disclosed that is configured to support a tailgate actuation system connected to a tailgate in a vehicle. The bracket includes a main body portion and an appendage that extends laterally inward from the main body portion such that the appendage is configured for connection to a body of the vehicle to reduce torsional displacement of the tailgate actuation system during operation of the tailgate.

In certain embodiments, the main body portion may include a through-hole that is configured to receive the tailgate actuation system such that the tailgate actuation system extends through the main body portion.

In certain embodiments, the appendage may extend from the main body portion in (generally) orthogonal relation.

In certain embodiments, the bracket may be monolithically formed from a single piece of material.

In certain embodiments, the main body portion and the appendage may each include a cross-sectional thickness that lies (substantially) within the range of (approximately) 4 mm to (approximately) 8 mm.

BRIEF DESCRIPTION OF THE DRAWINGS

According to common practice, the various features of the drawings may not be to scale and may be arbitrarily expanded or reduced for clarity.

DETAILED DESCRIPTION

Throughout the present disclosure, terms such as "support," "secure," "mount," "engage," "contact," and "connect" (and variations thereof) may be used interchangeably and should each be understood as referring to a physical interface between the pertinent structures and/or components.

The present disclosure describes a reinforcement solution for a tailgate actuation system that reduces (if not entirely eliminates) visible movement in outer body panels of the vehicle during tailgate operation. More specifically, the present disclosure describes a bracket including a main body portion that is configured to receive the tailgate actuation system and an appendage that extends laterally inward therefrom so as to brace the bracket against the vehicle body and thereby reduce (if not entirely eliminate) torsional displacement of the tailgate actuation system that may otherwise result in undesirable lateral (inward, outward) flexure of the outer body panels.

In various embodiments of the disclosure, it is envisioned that the bracket may be directly or indirectly connected (secured) to the vehicle body. For example, in one particular embodiment, an adhesive is positioned between the appendage and the vehicle body to accommodate for manufacturing variations and reduce gapping between the bracket and the vehicle body, thereby increasing (e.g., maximizing) the surface area available for contact and stability of the bracket. The adhesive also allows for repositioning of the bracket during connection to the vehicle body to increase precision and alignment between the tailgate actuation system and the tailgate, thereby enhancing (improving) operation of the tailgate and the overall fit, finish, and aesthetic appearance of the vehicle.

With general reference to FIGS. 1-4, a vehicle 10 is illustrated that includes: a vehicle body 12 and a tailgate 14 that is support by the vehicle body 12 such that the tailgate 14 is movable between a closed (first, raised) position and an open (second, lowered) position. The vehicle body 12 includes: an outer body panel 16 (FIGS. 6, 7); a strut tower 18 that is located (laterally) inward of the outer body panel 16; a rear (first) bolster 20 (FIG. 3) that extends laterally across the width of the vehicle 10 in transverse (e.g., orthogonal or generally orthogonal) relation to the strut tower 18; and a tail (second) bolster 22, which is located (positioned) within the rear bolster 20 such that the rear bolster 20 is located (positioned) between the strut tower 18 and the tail bolster 22 (e.g., to increase the strength and/or the rigidity of the rear bolster 20). The strut tower 18 overlays the rear bolster 20 and is reinforced by a rear strut 24, which is secured to an outer (lateral) surface 18o of the strut tower 18.

Figure 6:
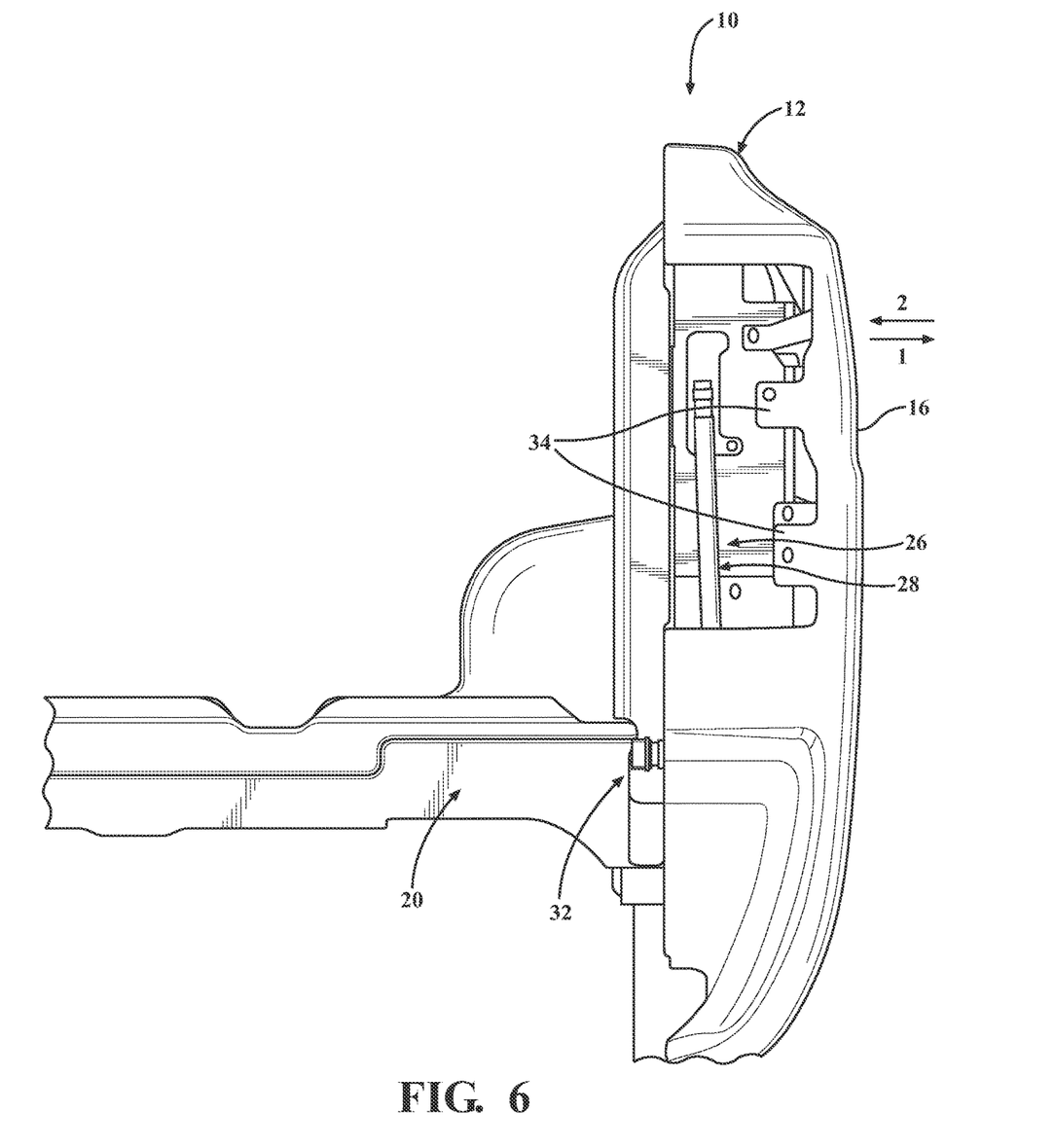
FIG. 6 is a partial, rear, plan view of the vehicle with the tailgate removed.

Movement of the tailgate 14 is supported (or otherwise facilitated) by a tailgate actuation system 26, which is configured to regulate the position of the tailgate 14 during use. More specifically, the tailgate actuation system 26 includes an actuator 28 (e.g., a gas stay 30, a pneumatic spring (shock), etc.) and a hinge assembly 32 that operatively connects the tailgate 14 to the actuator 28 so as to covert linear movement of the actuator 28 into rotational movement of the tailgate 14 to open and close (e.g., lower and raise) the tailgate 14 (depending upon the direction of movement of the actuator 28). As seen in FIG. 6, the tailgate actuation system 26 is concealed by the outer body panel 16 and the passenger side tail lamp (not shown), which is supported by flanges 34 that extend inwardly from the outer body panel 16.

Figure 1:
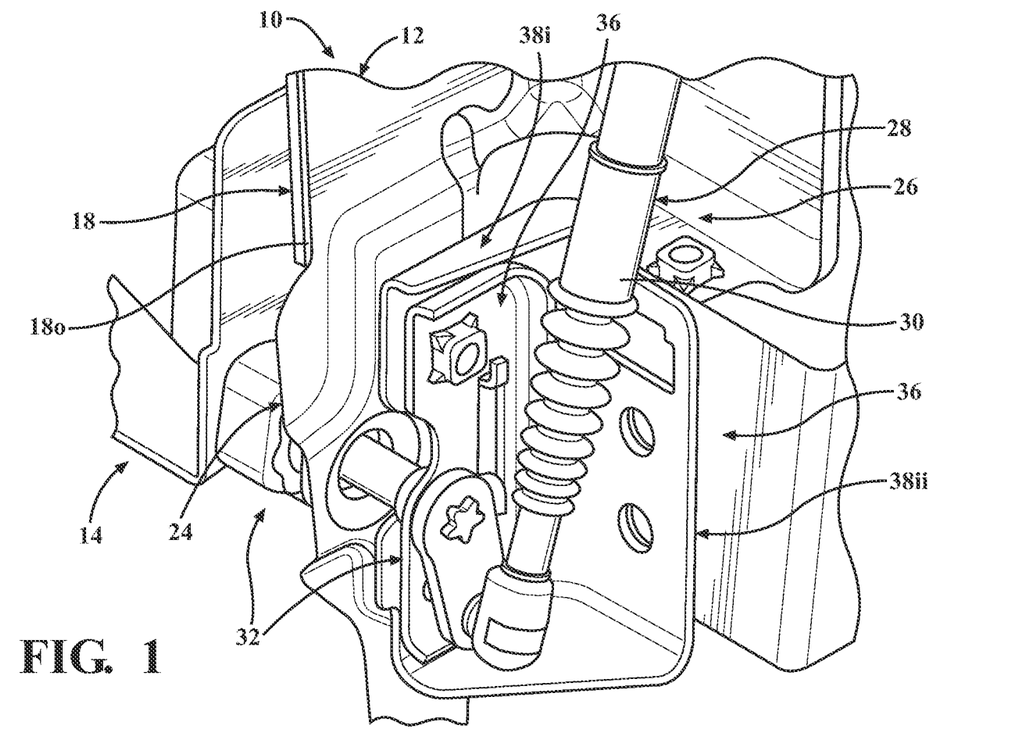
FIG. 1 is a partial, side, perspective view of a vehicle that includes: a tailgate; a tailgate actuation system; a nut plate; and a reinforcement including first and second brackets.
Figure 2:
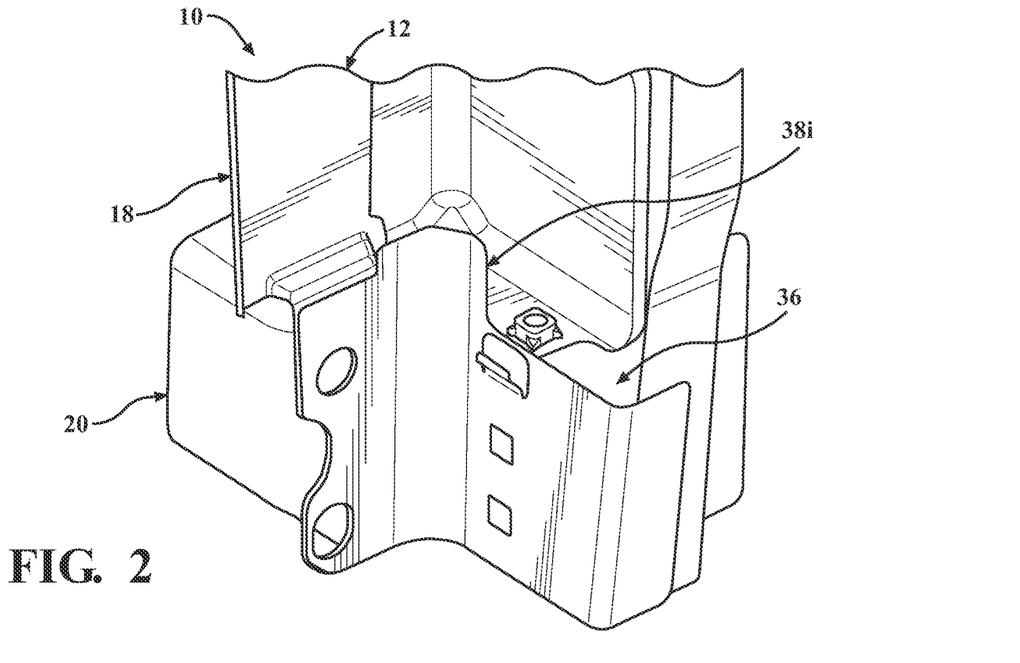
FIG. 2 is a partial, side, perspective view of the vehicle seen in FIG. 1 with the tailgate actuation system, the nut plate, and the second bracket removed.
Figure 3:
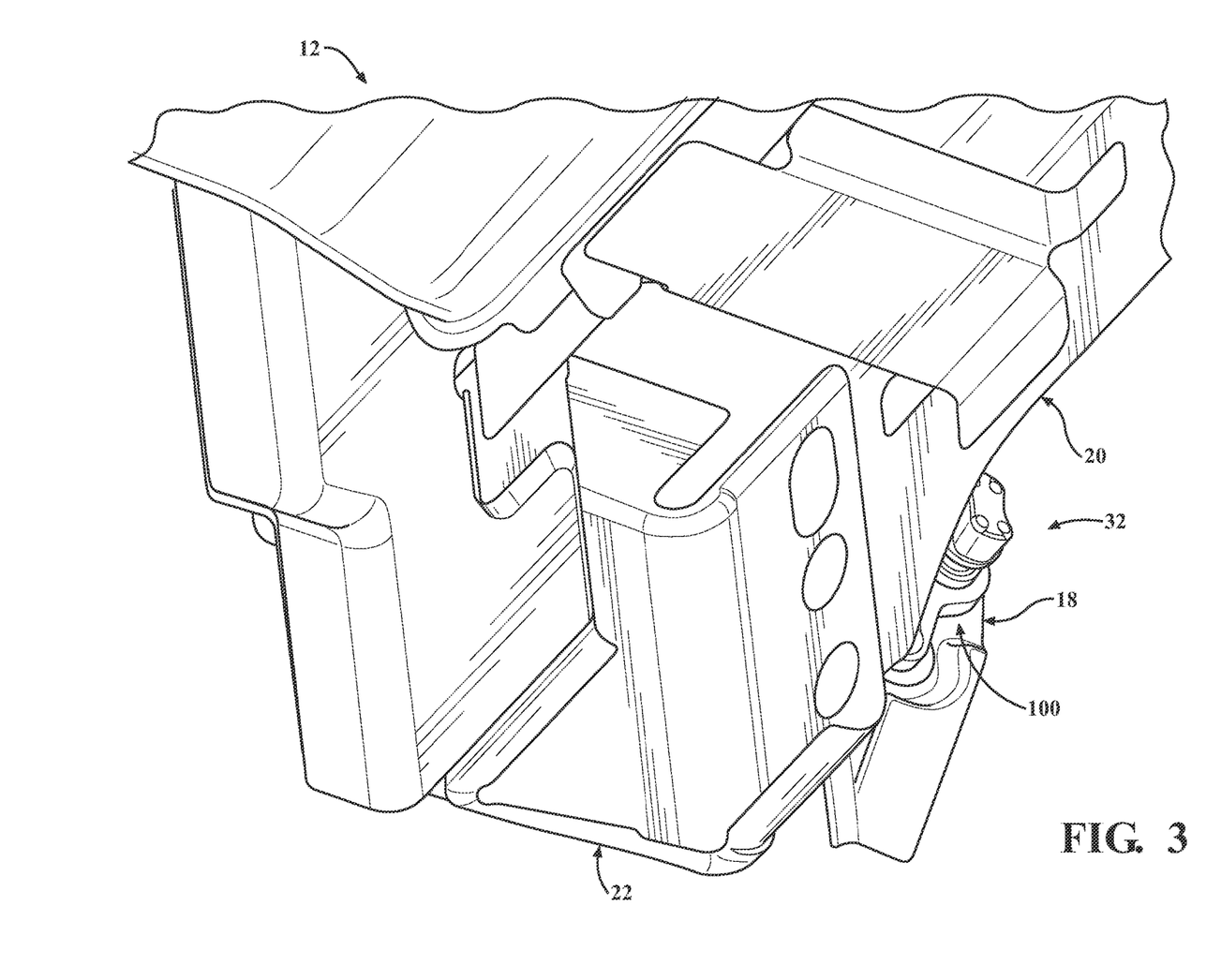
FIG. 3 is a partial, bottom, perspective view of the vehicle.

In the embodiment of the disclosure seen in FIGS. 1 and 2, the tailgate actuation system 26 is supported by a (known) reinforcement 36, which includes a plurality (series, set) of brackets 38i, 38ii that are arranged in a overlayed configuration such that the bracket 38ii is superimposed on (overlays) the bracket 38i. The inclusion of multiple brackets 38, however, not only increases the overall cost and mass of the reinforcement 36, but the complexity of assembly as well.

Figure 4:
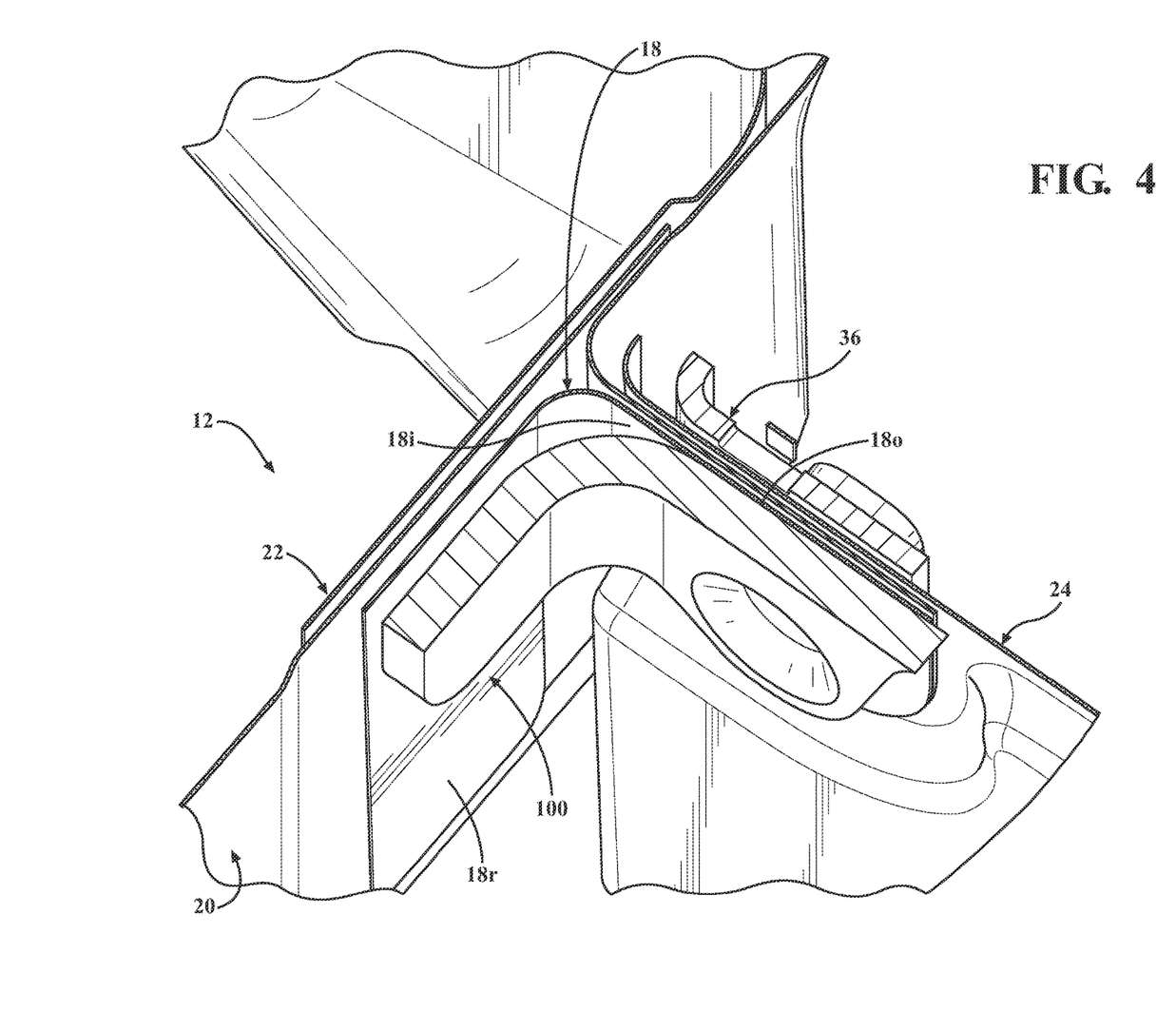
FIG. 4 is a partial, transverse (horizontal) cross-sectional view illustrating a bracket according to the present disclosure shown secured to the vehicle, which replaces the first and second brackets seen in FIG. 1.
Figure 5:
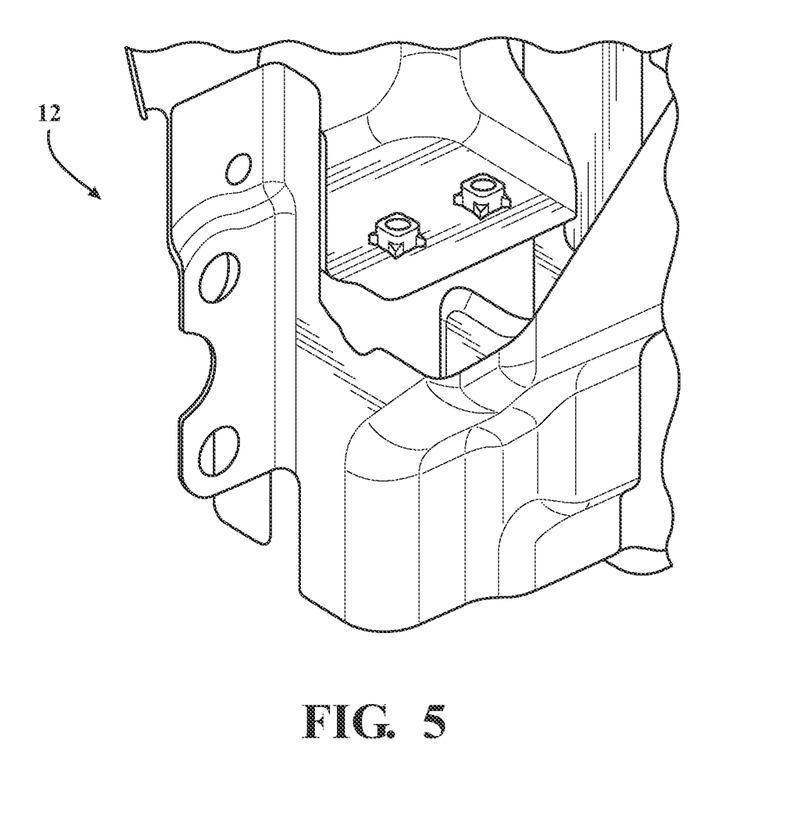
FIG. 5 is a partial, side, perspective view of the vehicle seen in FIG. 4 with the presently disclosed bracket removed.

With reference now to FIGS. 3-10, the presently disclosed bracket will be discussed, which is identified by the reference character 100 and replaces the aforedescribed brackets 38 (FIGS. 1, 2). The bracket 100 is secured to the vehicle body 12 and supports the tailgate actuation system 26 (FIGS. 1, 6) during operation of the tailgate 14 in a manner that inhibits (if not entirely prevents) lateral (inward, outward) flexure (or other such movement or deformation) of the outer body panel 16 in the directions indicated by arrows 1 and 2 (FIG. 6), as discussed in further detail below. More specifically, as seen in FIG. 4, the bracket 100 is secured to the strut tower 18 such that the strut tower 18 is positioned between the rear bolster 20 and the bracket 100. The bracket 100 allows for the outright elimination of the brackets 38i, 38ii (FIGS. 1, 2) and reconfiguration of the vehicle body 12 (FIG. 5) in a manner that captures the advantageous attributes and structural qualities provided by the brackets 38i, 38ii while reducing the overall complexity, weight, and cost of the vehicle 10, simplifying assembly, and improving functionality of the tailgate 14, as discussed in further detail below.

The bracket 100 is positioned between an inner lateral surface 18i (FIGS. 4, 7) of the strut tower 18, which is oriented towards the driver's side of the vehicle 10, and a rear surface 18r of the strut tower 18, which extends transversely (e.g., in orthogonal or generally orthogonal) relation to the inner lateral surface 18i and is oriented towards the tailgate 14 along the length of the vehicle 10. The bracket 100 includes a main body portion 102 that receives the tailgate actuation system 26 and an appendage 104 (e.g., an arm, flange) that extends from the main body portion 102. In the illustrated embodiment, the main body portion 102 and the appendage 104 are integrally (e.g., monolithically) formed from single piece of blended metallic material. It should be appreciated, however, that the bracket 100 may include (e.g., may be formed from) any material or combination of materials (whether metallic or non-metallic) capable of imparting the requisite structural integrity to the bracket 100.

The bracket 100 (e.g., the main body portion 102 and the appendage 104) defines an overall (cross-sectional) thickness T (FIG. 9) that is (generally) uniform and lies substantially within the range of (approximately) 4 mm to (approximately) 8 mm (e.g., (approximately) 6 mm). It should be appreciated, however, that the overall thickness T of the bracket 100 may be altered or varied as necessary or desired (e.g., dependent upon the particular style of the vehicle 10, the size of the tailgate 14, the force applied by the tailgate actuation system 26, etc.). As such, a bracket 100 defining an overall thickness T that lies outside the disclosed range would not be beyond the scope of the present disclosure.

The main body portion 102 of the bracket 100 includes a generally planar (e.g., flat) configuration defining a pair of opposing lateral faces (e.g., an outer (first) lateral face 102*o* and an inner (second) lateral face 102*i*) as well as one or more openings 106 (e.g., countersinks 108) and a through-hole 110. The openings 106 are configured to receive mechanical fasteners 112 (FIG. 9) (e.g., bolts, screws, pins, rivets, etc.) so as to (directly) connect the main body portion 102 of the bracket 100 to the vehicle body 12 (e.g., to the inner lateral surface 18*i* of the strut tower 18) in either a fixedly or removable manner. The through-hole 110 is configured to receive the tailgate actuation system 26 and, more specifically, the hinge assembly 32, such that hinge assembly 32 extends through the main body portion 102 to facilitate connection of the tailgate actuation system 26 to the tailgate 14.

While the bracket 100 includes a plurality (series, set) of openings 106 (e.g., respective first and second openings 106*i*, 106*ii*) in the particular embodiment illustrated throughout the figures, it should be appreciated that the number openings 106 and, thus, the number of mechanical fasteners 112 used to secure the main body portion 102 to the vehicle body 12, may be increased or decreased without departing from the scope of the present disclosure. For example, embodiments are envisioned in which the main body portion 102 may include a single opening 106 or three or more openings 106, as are embodiments in which the openings 106 may be omitted entirely. For example, it is envisioned that the main body portion 102 may be (directly) connected (secured) to the vehicle body 12 via one or more welds, (indirectly) connected to the vehicle body 12 through the use of an adhesive, etc.

Figure 9:
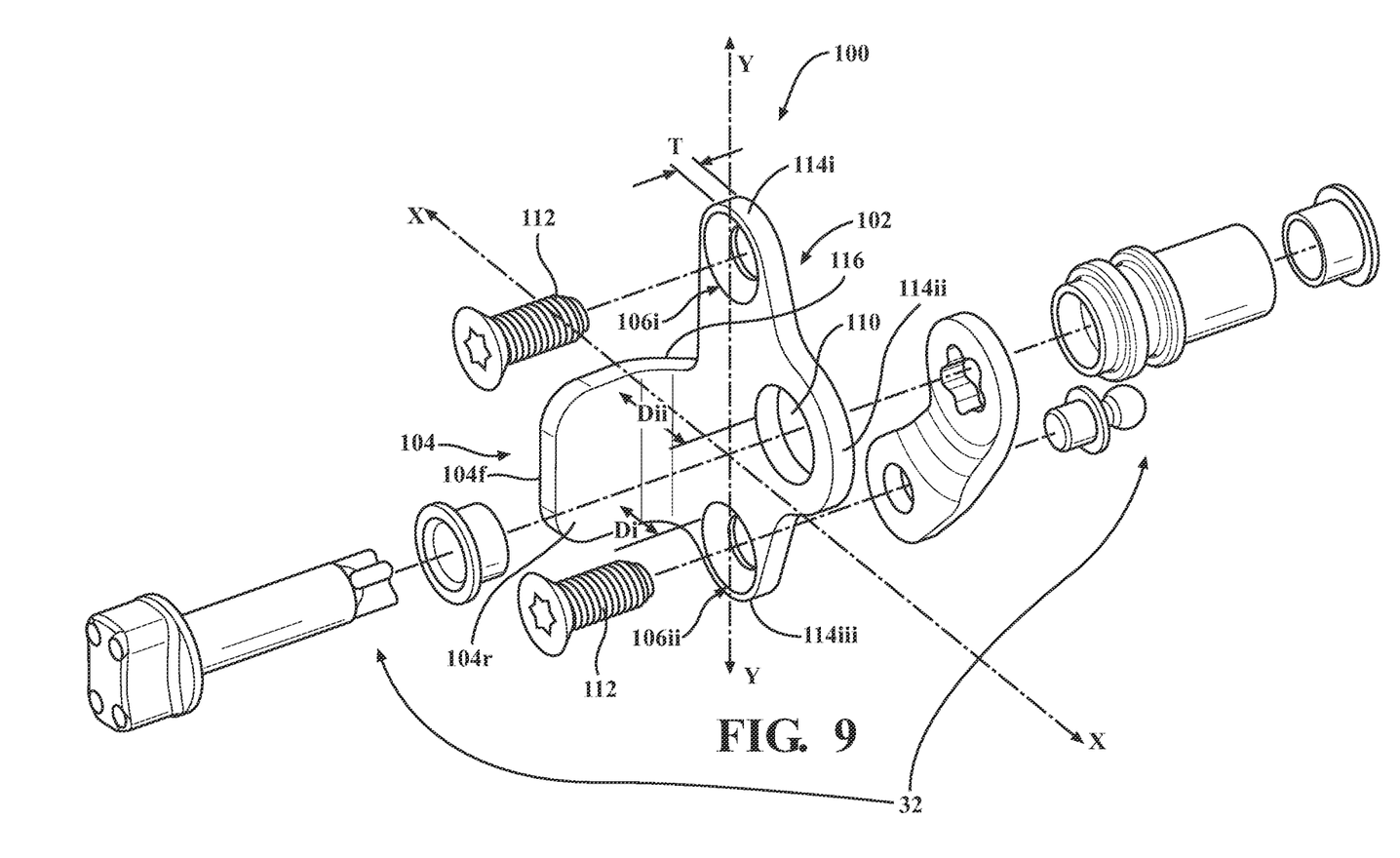
FIG. 9 is a side, perspective view of the presently disclosed bracket shown with a hinge assembly of the tailgate actuation system.

As seen in FIG. 9, the openings 106*i*, 106*ii* are aligned along a (vertical) axis Y that extends in orthogonal (or generally orthogonal) relation to the length of the vehicle 10 and are spaced a (first) distance Di from the appendage 104. The through-hole 110, however, is offset from openings 106*i*, 106*ii* and is spaced a (second) greater distance Dii from the appendage 104 such that the through-hole 110 is positioned outwardly (e.g., rearwardly) of the openings 106*i*, 106*ii*, whereby the main body portion 102 includes a triagonal (trilateral, triangular) configuration with radiused corner portions (apices) 114*i*, 114*ii*, 114*iii*.

While the main body portion 102 is illustrated as being symmetrical (or generally symmetrical) about an axis X (FIG. 9) that extends in orthogonal (or generally orthogonal) relation to the axis Y, it should be appreciated that the particular configuration of the bracket 100 may be varied without departing from the scope of the present disclosure depending, for example, upon the particular configuration of the tailgate 14, the particular configuration of the strut tower 18, the particular configuration of the tailgate actuation system 26 (e.g., the hinge assembly 32), etc. As such, embodiments in which the main body portion 102 may be asymmetrical about the axis X are also envisioned herein.

The appendage 104 extends transversely from the main body portion 102, which allows for positioning of the main body portion 102 adjacent to the inner lateral surface 18*i* of the strut tower 18 and positioning of the appendage 104 adjacent to the rear surface 18*r* of the strut tower 18. More specifically, in the particular embodiment illustrated, the appendage 104 extends from the main body portion 102 in orthogonal (or generally orthogonal) relation. It should be appreciated, however, that the relative orientations of the main body portion 102 and the appendage 104 may be varied in alternate embodiments of the disclosure (e.g., dependent upon the particular configuration of the vehicle 10, the configuration of the strut tower 18, etc.). As such, embodiments of the bracket 100 in which the main body portion 102 and the appendage 104 are oriented in non-orthogonal relation are also contemplated herein. For example, it is envisioned that the appendage 104 may extend from the main body portion 102 so as to define either an acute angle or an obtuse angle therebetween.

Figure 7:
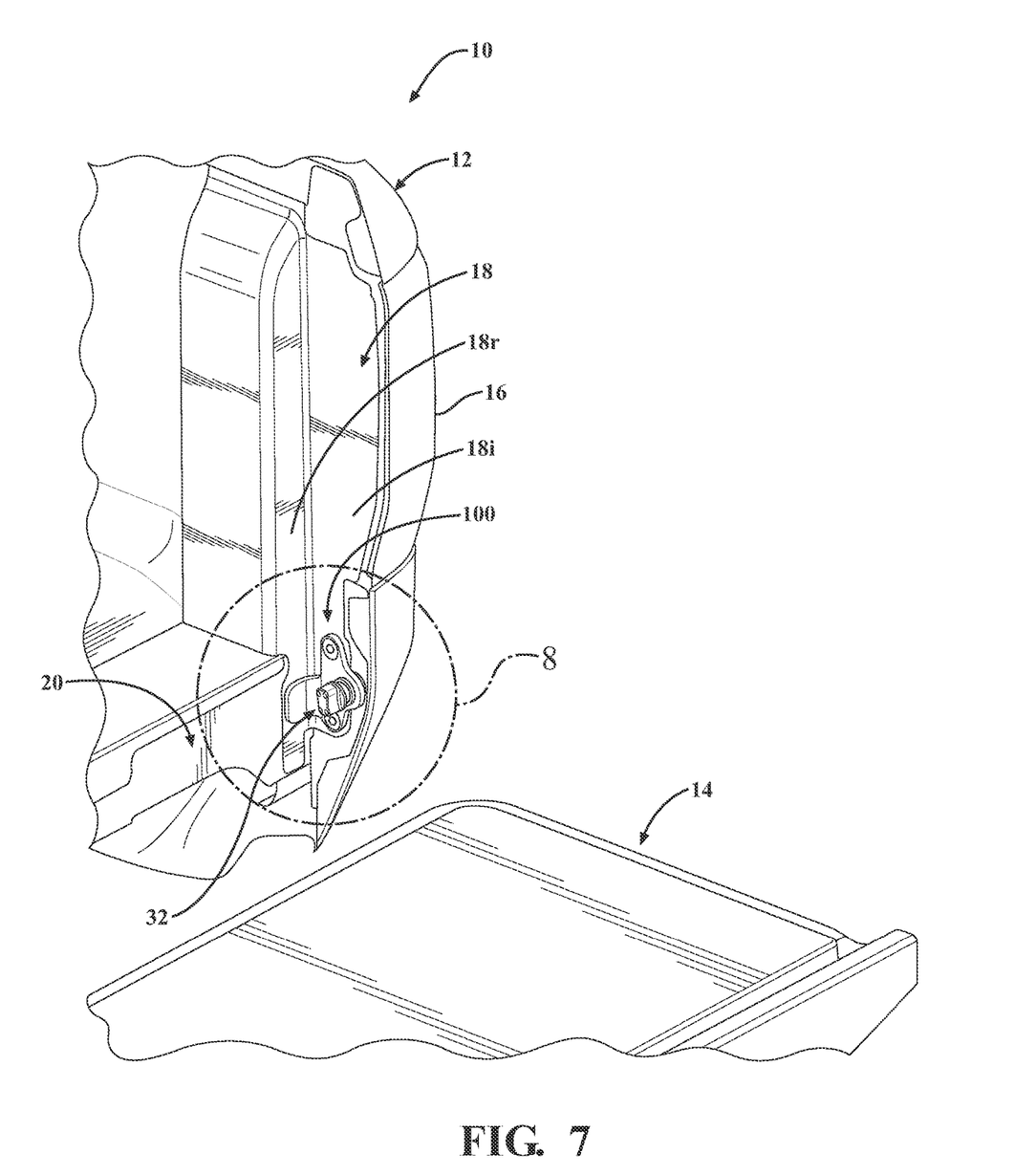
FIG. 7 is a partial, side, perspective view of the vehicle with the tailgate shown in an open (lowered) position and separated from the vehicle.

As discussed in further detail below, positioning of the bracket 100 between the respective inner and rear surfaces 18*i*, 18*r* of the strut tower 18 inhibits (if not entirely prevents) rotational deflection of the tailgate actuation system 26 (and the bracket 100) during operation of the tailgate 14 and, thus, lateral flexure (or other such movement or deformation) of the outer body panel 16 (FIGS. 6, 7).

In the particular embodiment of the disclosure illustrated throughout the figures, the appendage 104 extends from the main body portion 102 so as to define an arcuate (non-linear) transition 116 (FIG. 9). Embodiments in which the transition 116 may include a rectilinear configuration are also contemplated herein, however. For example, it is envisioned that the appendage 104 and the main body portion 102 may be connected so as to define an elbow (e.g., a corner section) of (approximately) 90 degrees.

The appendage 104 defines a pair of opposing faces (e.g., a forward (first, outer) face 104*f* and a rear (second, inner) face 104*r*) that are each (generally) planar (e.g., flat) in configuration. The (generally) planar configuration of the forward face 104*f*, in particular, facilitates connection of the appendage 104 to the vehicle body 12 (e.g., the rear surface 18*r* of the strut tower 18) to thereby increase (e.g., maximize, optimize) the surface area available for contact therebetween and, thus, stability of the bracket 100.

Figure 8:
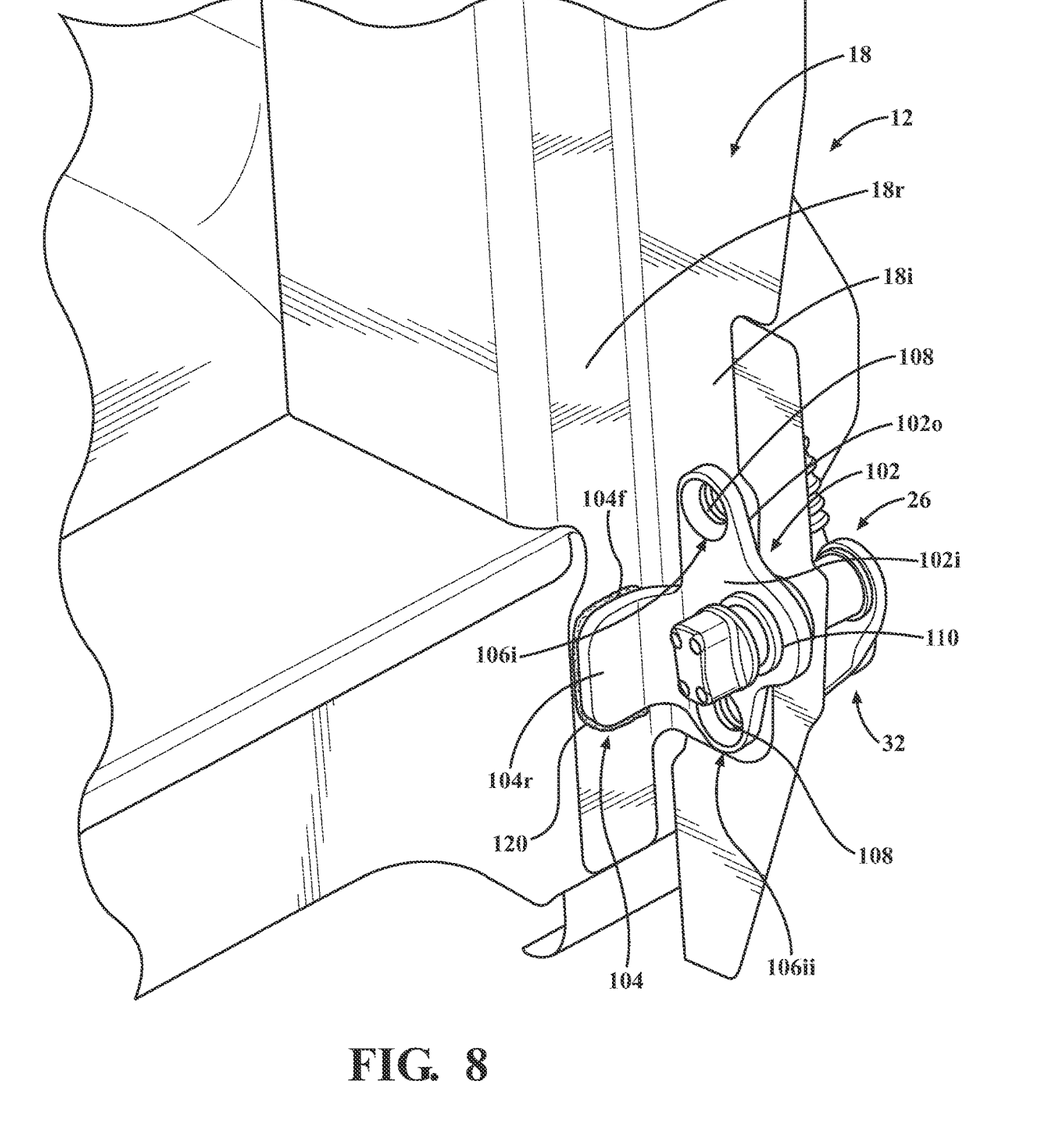
FIG. 8 is a side, perspective view of the presently disclosed bracket shown connected to the tailgate actuation system according to the area of detail identified in FIG. 7.

In the particular embodiment of the disclosure illustrated throughout the figures, the appendage 104 is indirectly secured to the rear surface 18*r* of the strut tower 18 via a thermally curable adhesive 120 (FIG. 8). It should be appreciated, however, that other adhesives 120 and methods for curing such adhesives 120 would not be beyond the scope of the present disclosure. The adhesive 120 accounts for manufacturing variations, design imperfections, build tolerances, etc., by filling in any gaps between the appendage 104 and the rear surface 18*r* of the strut tower 18 that may otherwise reduce the surface area available for contact therebetween. The adhesive 120 thus further increases (e.g., maximizes, optimizes) surface contact between the appendage 104 and the strut tower 18 to enhancement securement between the bracket 100 and the vehicle body 12.

The use of a curable adhesive allows for repositioning of the bracket 100 during connection of the appendage 104 to the rear surface 18r of the strut tower 18 to increase precision in orientation of the bracket 100 and, thus, improve alignment of the hinge assembly 32 and the tailgate 14. Improved alignment of the hinge assembly 32 and the tailgate 14 not only further accommodates for manufacturing variations, design imperfections, build tolerances, etc., but enhances (improves) operation of the tailgate 14 and the overall fit, finish, and aesthetic appearance of the vehicle 10.

In alternate embodiments of the disclosure, it is envisioned that the adhesive 120 may be omitted and that the appendage 104 may be directly connected to the vehicle body 12 via one or more mechanical fasteners (e.g., bolts, screws, pins, rivets, etc.), via one or more welds, etc. As such, the present disclosure envisions a variety of embodiments in which either or both of the main body portion 102 and the appendage 104 may be directly or indirectly connected to the vehicle body 12.

With reference now to FIGS. 6-10, use of the bracket 100 will be discussed. During connection of the bracket 100 to the vehicle body 12, the appendage 104 is positioned as required to facilitate proper alignment between the hinge assembly 32 and the tailgate 14. Adjustments in the specific orientation of the bracket 100 are allowed via the adhesive 120 (FIG. 8), which is applied (located) between the appendage 104 and the rear surface 18r of the strut tower 18 so as to reduce gapping between the appendage 104 and the vehicle body 12. Once the position of the bracket 100 has been finalized, the adhesive 120 can be cured (e.g., via the application of thermal energy to the adhesive 120, the bracket 100, the vehicle body 12, etc.) such that the appendage 104 securely engages the vehicle body 12.

Either prior or subsequent to curing of the adhesive 120, the tailgate actuation system 26 and the bracket 100 are connected such that the hinge assembly 32 extends between the actuator 28 and the tailgate 14 through the main body portion 102 of the bracket 100 (via the through-hole 110), and the main body portion 102 is secured to the inner lateral surface 18i of the strut tower 18 (e.g., via the mechanical fasteners 112). In certain embodiments of the disclosure, such as that illustrated throughout the figures, it is envisioned that a nut plate 36 (FIG. 10) may be secured to the rear strut 24 (and/or the strut tower 18) to further increase the rigidity and stability of the vehicle body 12, the tailgate actuation system 26 (e.g., the hinge assembly 32), etc.

Figure 10:
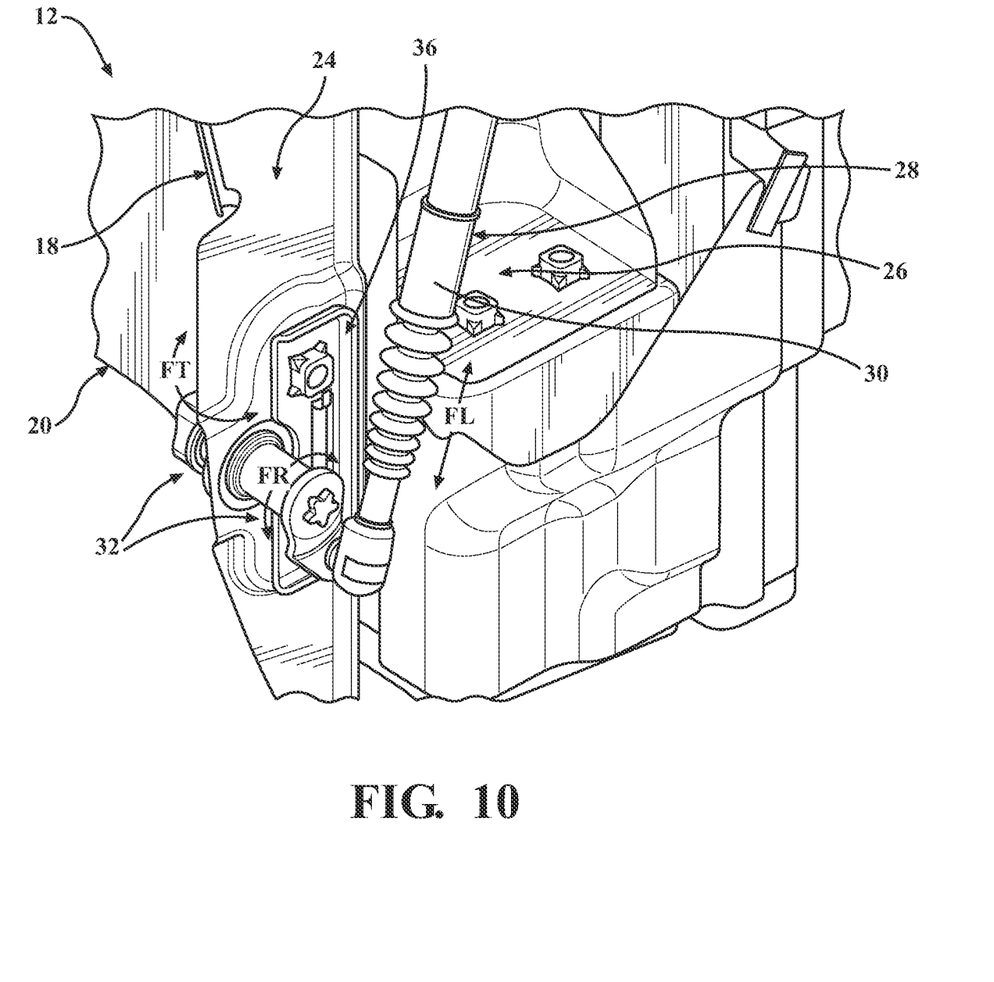
FIG. 10 is a partial, side, perspective view of the vehicle illustrating the tailgate, the tailgate actuation system, the nut plate, and the presently disclosed bracket upon assembly.

Upon secured connection of the bracket 100 to the vehicle body 12, the appendage 104 extends laterally inward from the main body portion 102 so as to brace the bracket 100 against the strut tower 18, which allows the bracket 100 to counteract forces exerted by the tailgate actuation system 26 during operation of the tailgate 14 (FIG. 7). More specifically, via the hinge assembly 32, the actuator 28 acts upon the tailgate 14 to slow movement between the closed and open positions. As seen in FIG. 10, during movement of the actuator 28, a linear force FL is transmitted to the hinge assembly 32 and is converted into a rotational force FR that is applied to the tailgate 14, which results in the application of a torsional (twisting) force FT to the hinge assembly 32 that is resisted by the bracket 100, thereby stabilizing the hinge assembly 32. Stabilizing the hinge assembly 32 reduces (if not entirely eliminates) torsional displacement (e.g., of the tailgate actuation system 26, the bracket 100, etc.) during operation (movement) of the tailgate 14, thereby improving functionality of the tailgate 14 and reducing (if not entirely eliminating) lateral flexure of the outer body panel 16 and the "breathing effect" that may otherwise occur.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately," "generally," and "substantially" should be understood to encompass no variation in the appurtenant range or concept with whey they are associated as well as variations on the order of up to 25% (e.g., to allow for manufacturing tolerances and/or deviations in design).

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:
a vehicle body including an outer body panel;
a tailgate movable in relation to the vehicle body via a tailgate actuation system between a closed position and an open position; and
a bracket configured to receive the tailgate actuation system, the bracket including a main body portion and an appendage extending transversely from the main body portion such that the appendage engages the vehicle body to inhibit rotational deflection of the tailgate actuation system and, thus, lateral flexure of the outer body panel during movement of the tailgate, wherein the bracket is configured such that the appendage extends away from the outer body panel.

2. The vehicle of claim 1, wherein the bracket is monolithically formed from a single piece of material.

3. The vehicle of claim 1, wherein the bracket includes a cross-sectional thickness substantially within a range of approximately 4 mm to approximately 8 mm.

4. The vehicle of claim 1, wherein the appendage extends from the main body portion in generally orthogonal relation.

5. The vehicle of claim 1, wherein the bracket is directly connected to the vehicle body.

6. The vehicle of claim 5, wherein the bracket is connected to the vehicle body via one or more mechanical fasteners.

7. The vehicle of claim 5, wherein the bracket is welded to the vehicle body.

8. The vehicle of claim 1, wherein the bracket is indirectly connected to the vehicle body.

9. The vehicle of claim 8, further comprising an adhesive located between the appendage and the vehicle body to accommodate for manufacturing variations and reduce gapping between the bracket and the vehicle body.

10. The vehicle of claim 9, wherein the adhesive is thermally curable to allow for repositioning of the bracket during connection to the vehicle body to increase precision in orientation of the bracket.

11. A vehicle comprising:
a vehicle body including:
an outer body panel;
a strut tower located inwardly of the outer body panel, the strut tower defining an inner lateral surface and a rear surface extending transversely in relation to the inner lateral surface;
a first bolster extending transversely in relation to the strut tower; and
a second bolster positioned within the first bolster such that the first bolster is located between the strut tower and the second bolster;
a tailgate movably supported in relation to the vehicle body;
a tailgate actuation system connected to the tailgate and including:
an actuator; and
a hinge assembly extending between the actuator and the tailgate to convert linear movement of the actuator into rotational movement of the tailgate to open and close the tailgate; and
a bracket including:
a main body portion connected to the inner lateral surface of the strut tower; and
an appendage extending from the main body portion and connected to the rear surface of the strut tower, the hinge assembly extending through the bracket to thereby reduce torsional displacement of the hinge assembly and lateral flexure of the outer body panel during operation of the tailgate actuation system.

12. The vehicle of claim 11, wherein the appendage extends from the main body portion in generally orthogonal relation.

13. The vehicle of claim 11, wherein the appendage is indirectly connected to the rear surface of the strut tower.

14. The vehicle of claim 13, further comprising an adhesive located between the appendage and the rear surface of the strut tower to increase surface area contact therebetween.

15. The vehicle of claim 14, wherein the adhesive is thermally curable to allow for repositioning of the bracket during connection of the appendage to the rear surface of the strut tower to increase precision in orientation of the bracket.

16. A bracket configured to support a tailgate actuation system connected to a tailgate in a vehicle, the bracket comprising:
a main body portion; and
an appendage extending laterally inward from the main body portion such that the appendage is configured for connection to a body of the vehicle to reduce torsional displacement of the tailgate actuation system during operation of the tailgate, wherein the main body portion includes a triagonal configuration defining a first apex, a second apex located vertically below the first apex, and a third apex located rearwardly of the first apex and the second apex along a length of the vehicle when the bracket is connected to the body of the vehicle, wherein the appendage includes an uppermost vertical end positioned between the first apex and the second apex.

17. The bracket of claim 16, wherein the main body portion includes a through-hole configured to receive the tailgate actuation system such that the tailgate actuation system extends through the main body portion.

18. The bracket of claim 16, wherein the appendage extends from the main body portion in generally orthogonal relation.

19. The bracket of claim 16, wherein the main body portion and the appendage each include a cross-sectional thickness substantially within a range of approximately 4 mm to approximately 8 mm.

20. The bracket of claim 16, wherein the bracket is configured such that the appendage is located below a bed of the vehicle.

* * * * *